US008549206B2

United States Patent
Hsu et al.

(10) Patent No.: US 8,549,206 B2
(45) Date of Patent: Oct. 1, 2013

(54) METHOD OF ESTABLISHING VIRTUAL USB INTERFACE FOR NON-USB APPARATUS AND THE NON-USB APPARATUS THEREOF

(75) Inventors: Hao Sheng Hsu, Hsinchu County (TW); Chiung Hsun Hsu, Hsinchu County (TW); Jih Chun Tsai, Hsinchu County (TW)

(73) Assignee: Ralink Technology Corporation, Jhubei, Hsinchu County (TW)

( * ) Notice: Subject to any disclaimer, the term of this patent is extended or adjusted under 35 U.S.C. 154(b) by 246 days.

(21) Appl. No.: 13/228,128

(22) Filed: Sep. 8, 2011

(65) Prior Publication Data

US 2012/0254473 A1    Oct. 4, 2012

(30) Foreign Application Priority Data

Apr. 1, 2011    (TW) .............................. 100111479 A

(51) Int. Cl.
*G06F 13/38*    (2006.01)
*G06F 13/00*    (2006.01)

(52) U.S. Cl.
USPC ............................... 710/315; 710/305; 710/5

(58) Field of Classification Search
USPC .............................. 710/313–315, 305–306, 5
See application file for complete search history.

(56) References Cited

U.S. PATENT DOCUMENTS

| | | | |
|---|---|---|---|
| 7,051,149 B2 * | 5/2006 | Wang et al. .................... 710/315 |
| 8,006,023 B1 * | 8/2011 | Pan et al. ....................... 710/313 |
| 8,384,670 B1 * | 2/2013 | Wright .......................... 345/168 |
| 8,447,910 B1 * | 5/2013 | Yi et al. ......................... 710/315 |
| 2004/0064607 A1 * | 4/2004 | Odakura et al. ................ 710/57 |
| 2005/0240685 A1 * | 10/2005 | Keys ................................. 710/8 |
| 2007/0005867 A1 * | 1/2007 | Diamant ....................... 710/306 |
| 2007/0174534 A1 * | 7/2007 | Wurzburg et al. ............ 710/315 |

* cited by examiner

*Primary Examiner* — Christopher Shin
(74) *Attorney, Agent, or Firm* — Hamre, Schumann, Mueller & Larson, P.C.

(57) ABSTRACT

A method of establishing a virtual USB interface for a non-USB device, comprising the steps of establishing a non-USB interface to communicate with the non-USB device, generating a virtual USB physical device object to provide a USB transport layer driver, establishing the virtual USB interface to communicate with the USB transport layer driver, filtering a transmitting command of the USB transport layer driver based on the virtual USB interface, and filtering a returned information of the non-USB device based on the non-USB interface.

13 Claims, 4 Drawing Sheets

METHOD OF ESTABLISHING VIRTUAL USB INTERFACE FOR NON-USB APPARATUS AND THE NON-USB APPARATUS THEREOF

BACKGROUND OF THE INVENTION

1. Technical Field

The present invention relates to a Universal Serial Bus (USB) interface, and more particularly relates to a virtual Universal Serial Bus interface.

2. Background

Universal Serial Bus (USB) is a transmission interface connecting peripheral devices to a host controller (for example, computer). USB can support peripheral devices, such as keyboard, mouse, digital camera, printer and hard disk. Nowadays, USB transmission interface has become a standard interface for most peripheral devices. With the maturity of wireless communications, USB can also support bluetooth wireless communication hardware devices.

On the present market, the majority of bluetooth devices are connected to computers by USB interface. Bluetooth communication standard defines USB transport layer, and therefore, manufacturers of bluetooth wireless communication devices can develop corresponding profile stack of bluetooth wireless communication protocols based on the bluetooth communication standard.

However, for bluetooth wireless devices with non-USB interface, for example, Peripheral Component Interconnect Express (PCIe), as a transmission interface for the bluetooth wireless devices, it will be troublesome since the operating system providers do not provide additional software for them. For example, Microsoft only provides the profile stack for USB interface. In such case, the manufacturers of bluetooth wireless devices need to spend more time defining another PCIe transport layer in profile stack of bluetooth wireless communication protocols.

Accordingly, to solve such problem, one will need a new method of using non-USB device to establish virtual USB interface.

SUMMARY

A method of establishing a virtual USB interface for a non-USB device, comprising the steps of establishing a non-USB interface to communicate with the non-USB device, generating a virtual USB physical device object to provide a USB transport layer driver, establishing the virtual USB interface to communicate with the USB transport layer driver, filtering a transmitting command of the USB transport layer driver based on the virtual USB interface, and filtering a returned information of the non-USB device based on the non-USB interface.

A non-USB device with a driver carrying out the steps of establishing a non-USB interface to communicate with the non-USB device, generating a virtual USB physical device object to provide a USB transport layer driver, establishing a virtual USB interface to communicate with the USB transport layer driver, filtering commands sent by the USB transport layer driver based on the virtual USB interface, and filtering returned data of the non-USB device based on the non-USB interface.

The foregoing has outlined rather broadly the features and technical advantages of the present invention in order that the detailer description of the invention that follows may be better understood. Additional features and advantages of the invention will be described hereinafter, and from the subject of the claim of the invention. It should be appreciated by those skilled in the art that the conception and specific embodiment disclosed may be readily utilized as a basic for modifying or designing other structures or processes for carrying out the same purpose as the present invention. It should also be realized by those skilled in the art that such equivalent construction do not depart from the spirit and scope of the invention as set forth in the appended claims.

DETAILED DESCRIPTION

The method of the present invention establishes a virtual USB interface for a non-USB device. In one embodiment of the present invention, the non-USB device uses the PCIe as a transmission interface for a bluetooth wireless device. However, the non-USB device in the present invention is not limited in the bluetooth wireless device, and the transmission interface is not limited to PCIe; any device encompassed by the scope the present invention may be used.

Figure 1:
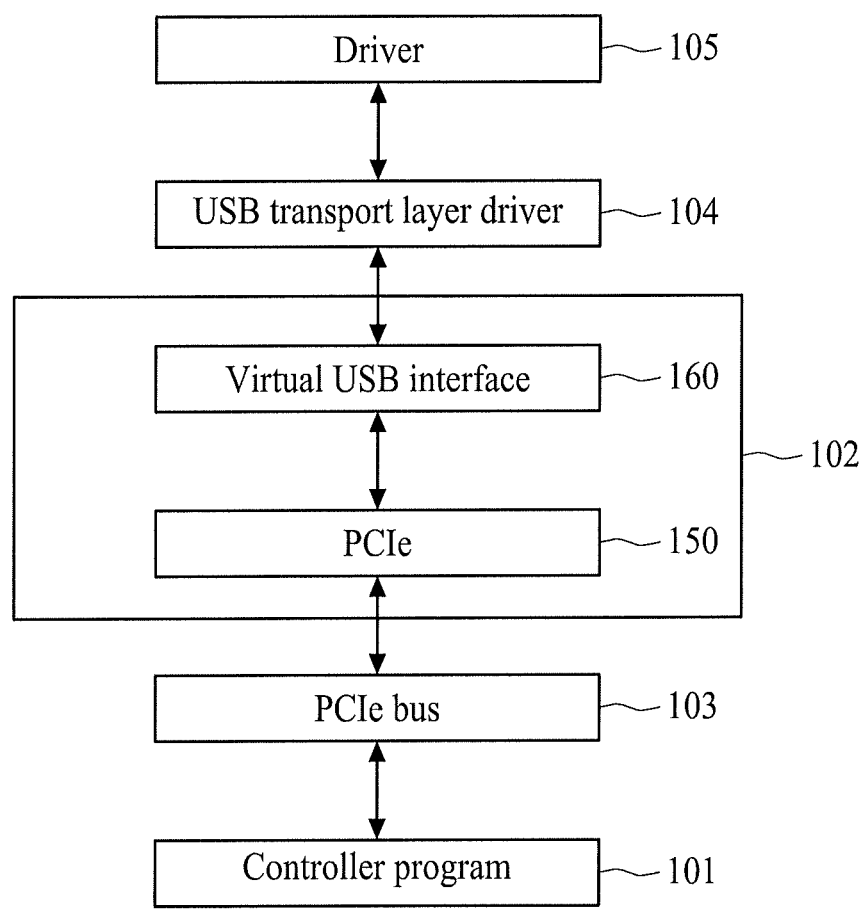
FIG. 1 shows a non-USB device connected to a host controller system according to one embodiment of the present invention.

FIG. 1 shows a non-USB device connected to a host controller system according to one embodiment of the present invention. In FIG. 1, the PCIe is used as the transmission interface of the bluetooth wireless device, which has a controller program 101 and a driver 102, and is connected to a host controller through a PCIe 103. The host controller has a USB transport layer driver 104 and other higher level driver 105. The driver 102 can operate and establish a PCIe 150 and a virtual USB interface 160. The higher level driver 105 uses the USB transport layer driver 104 to communicate with the driver 102 through the virtual USB interface 160. The driver 102 uses the PCIe 150 to communicate with the controller program 101 through the PCIe hardware bus 103.

As shown in FIG. 1, the driver 102 establishes the PCIe 150 and the virtual USB interface 160. In operation, the driver 102 generates a virtual USB physical device object (PDO) to provide the USB transport layer driver 104. The USB transport layer driver 104 can load a virtual USB physical device object identification (ID), and that is a virtual USB device. The USB transport layer driver 104 communicates with the virtual USB device through the virtual USB interface 160.

Figure 2:
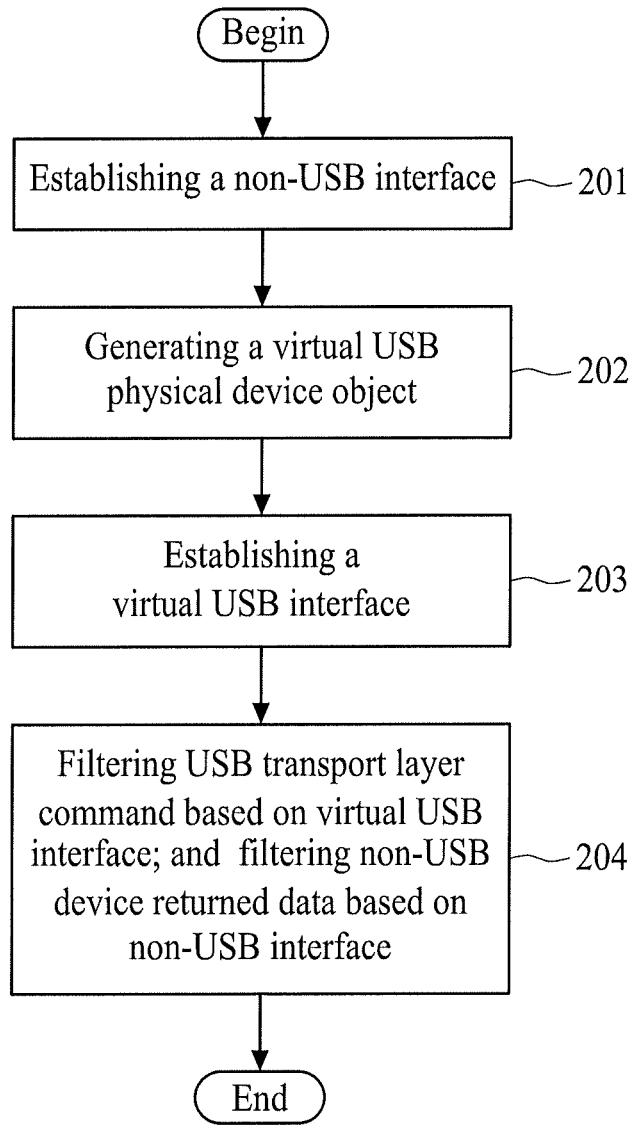
FIG. 2 shows a flow chart for the non-USB device to establish the virtual USB interface according to one embodiment of the present invention.

FIG. 2 shows a flow chart of how the non-USB device establishes the virtual USB interface according to one embodiment of the present invention. In step 201, a non-USB interface is established to communicate with the non-USB device. In step 202, a virtual USB physical device object is generated to provide a USB transport layer driver. In step 203, a virtual USB interface is established to communicate with the USB transport layer driver.

In step 204, the virtual USB interface filters the commands sent by the USB transport layer driver, and the non-USB interface filters returned data of the non-USB device.

As shown in FIG. 1 and FIG. 2, the driver 102 in FIG. 1 can operate to implement the method in FIG. 2. As shown in FIG. 1, the driver 102 generates a virtual USB physical device object to produce a virtual USB device. For the command transmitted by the USB transport layer driver 104, the virtual USB device supports all of the USB functions and operates all of the commands transmitted by USB transport layer driver 104. In practice, the driver 102 filters the command transmitted by the USB transport layer driver 104 with the virtual USB interface 160; for example, the driver 102 executes the initial setting of the USB and the related command of the USB level, and sends the related commands of the bluetooth wireless physical layer to the bluetooth wireless device. Preferably, the driver 102 can directly operate the USB initial setting and the related command of the USB level.

Figure 3:
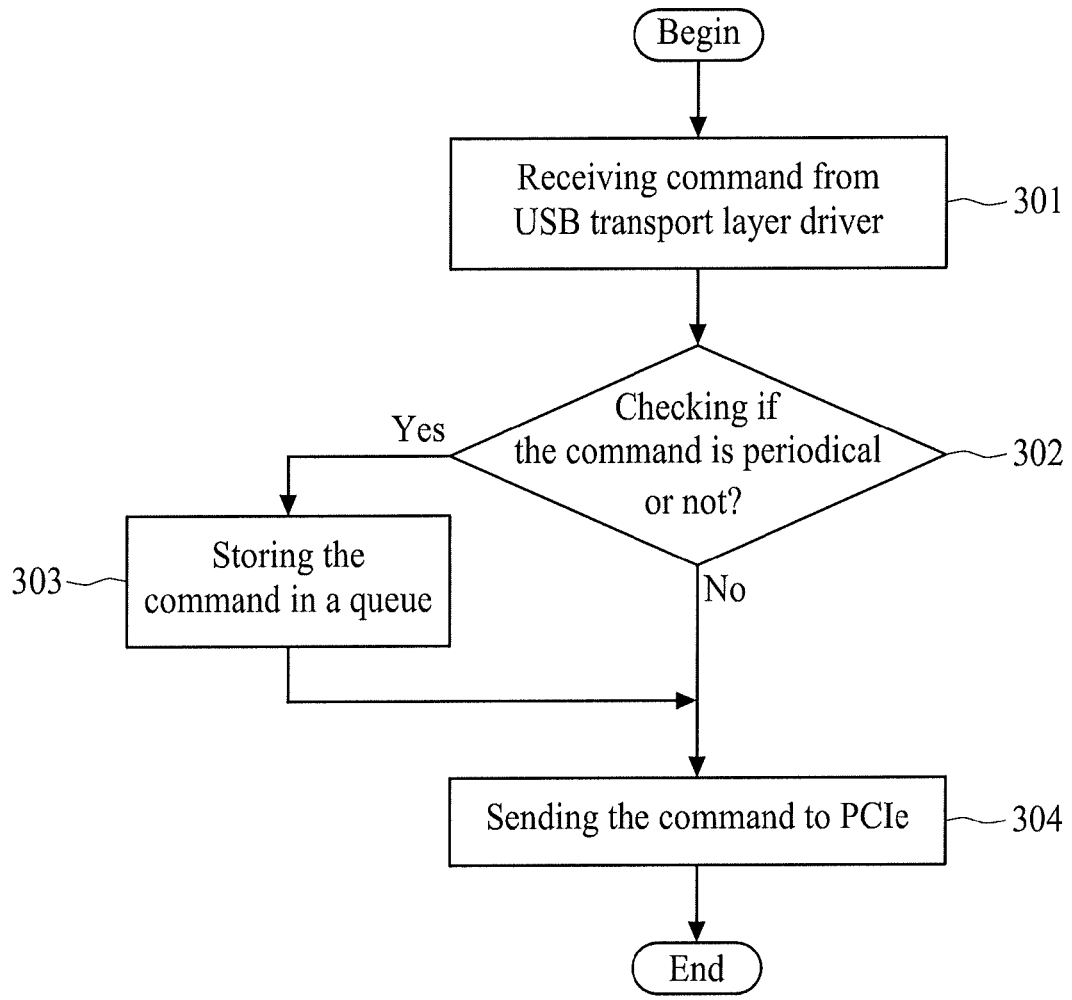
FIG. 3 shows a flow chart of step 204 in FIG. 2 according to one embodiment of the present invention.

The following shows the operation of the virtual USB interface filtering the command sent by the USB transport layer. FIG. 3 shows a flow chart of step 204 in FIG. 2 according to one embodiment of the present invention. In step 301, the virtual USB interface 160 receives the command of the USB transport layer driver 104. In step 302, operations are performed to check if the command is periodical. If it is, step 303 is performed; otherwise, step 304 is performed. In step 303, the command is stored in a queue. In step 304, the command is sent to the PCIe 150.

As shown in FIG. 3, the driver 102 supports all of the USB related functions, including the function of periodical sending command. Accordingly, the virtual USB interface 160 uses the periodical command, such as the command of voice related data is periodically sent to the PCIe 150.

Figure 4:
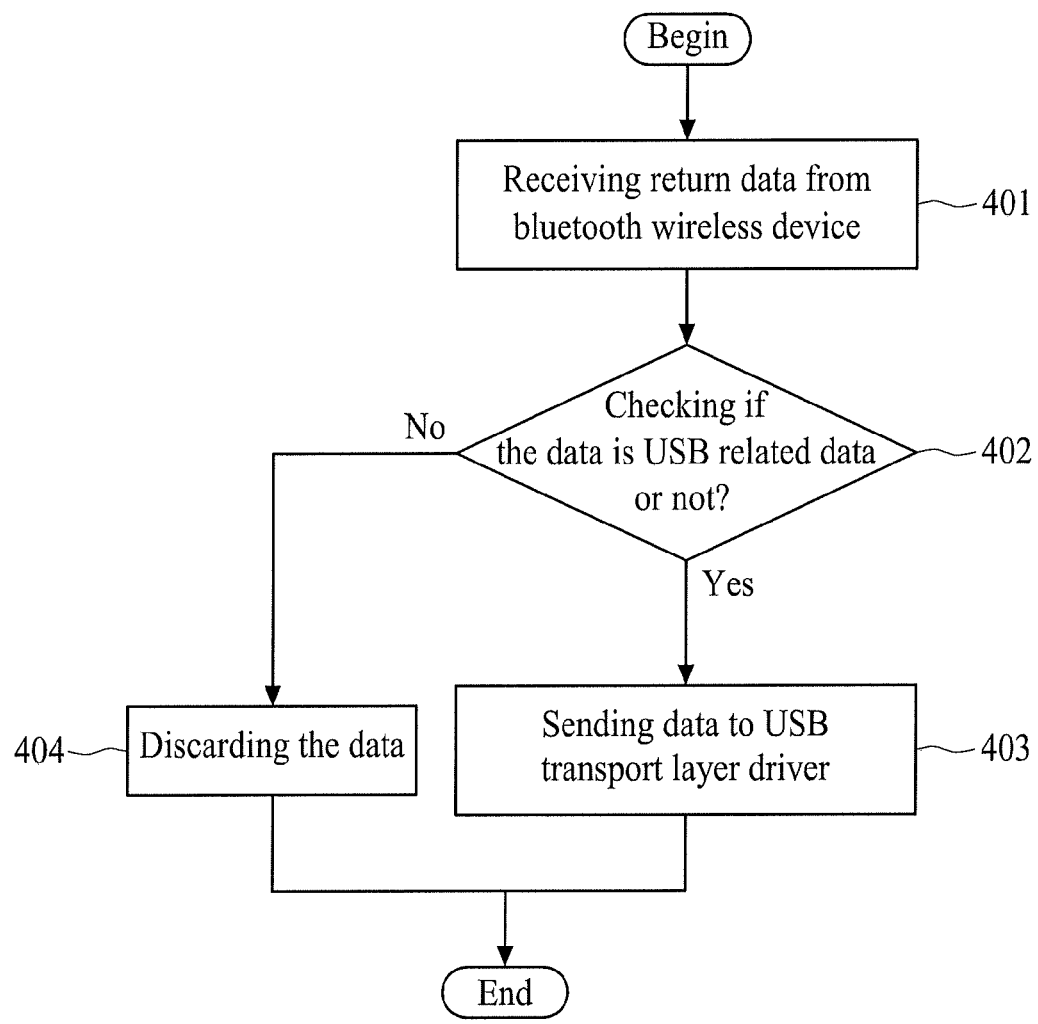
FIG. 4 shows a flow chart of the step 204 in FIG. 2 according to another embodiment of the present invention.

Similar to the method in FIG. 3, the PCIe 150 also filters the returned data of the bluetooth wireless device. FIG. 4 shows a flow chart of the step 204 in FIG. 2 according to another embodiment of the present invention. In step 401, the PCIe 150 receives the returned data of the bluetooth device. In step 402, operations are performed to check if the returned data is USB related data. If it is, step 403 is performed; otherwise, step 404 is performed. In step 403, the data is sent to the USB transport layer driver. In step 404, the data is discarded.

As shown in FIG. 4, the PCIe 150 sends back the data of the USB level to the USB transport layer driver, and discards the data of the non-USB level.

In conclusion, the method of the present invention establishes the virtual USB interface and the device for the non-USB device, uses the driver to produce the virtual USB physical device object, and operates the USB transport layer driver and communicates with the virtual USB device. Consequently, the purpose of establishing the virtual USB interface is implemented.

Although the disclosure and its advantages have been described in detail, it should be understood that various changes, substitutions and alterations can be made herein without departing from the spirit and scope of the disclosure as defined by the appended claims. For example, many of the processes discussed above can be implemented in different methodologies or replaced by other processes, or both.

Moreover, the scope of the present application is not intended to be limited to the particular embodiments of the process, machine, manufacture, composition of matter, means, methods and steps described in the specification. As one of ordinary skill in the art will readily appreciate from the disclosure of the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps.

What is claimed is:

1. A method of establishing a virtual USB interface for a non-USB device, comprising the steps of:
    establishing a non-USB interface to communicate with the non-USB device;
    generating a virtual USB physical device object to provide a USB transport layer driver;
    establishing the virtual USB interface to communicate with the USB transport layer driver;
    filtering a transmitting command of the USB transport layer driver based on the virtual USB interface; and
    filtering a returned information of the non-USB device based on the non-USB interface.

2. The method of claim 1, wherein the virtual USB interface filters initial operation related commands and USB transport layer related commands, and sends the physical layer related commands of the virtual USB device to the non-USB device.

3. The method of claim 1, wherein the virtual USB interface directly sends non-periodical commands to the non-USB device, and stores periodical commands in a queue to periodically send to the non-USB device.

4. The method of claim 1, wherein the non-USB interface sends USB related commands to the USB transport layer driver.

5. The method of claim 1, wherein the non-USB interface is a PCIe.

6. The method of claim 1, wherein the non-USB device is a bluetooth device.

7. A non-USB device with a driver operating the steps of:
    establishing a non-USB interface to communicate with the non-USB device;
    generating a virtual USB physical device object to provide a USB transport layer driver;
    establishing a virtual USB interface to communicate with the USB transport layer driver;
    filtering commands sent by the USB transport layer driver based on the virtual USB interface; and
    filtering returned data of the non-USB device based on the non-USB interface.

8. The non-USB device of claim 7, wherein the driver operates the steps of:
    executing USB initial settings; and
    executing USB level related commands.

9. The non-USB device of claim 7, wherein the virtual USB interface filters initial operation related commands and USB level related commands, and sends the device physical layer related commands of the virtual USB device to the non-USB device.

10. The non-USB device of claim 7, wherein the virtual USB interface directly sends non-periodical commands to the non-USB device, and stores periodical commands in a queue to periodically send to the non-USB device.

11. The non-USB device of claim 7, wherein the non-USB interface sends USB related commands to the USB transport layer driver.

12. The non-USB device of claim 7, wherein the non-USB interface is a PCIe.

13. The non-USB device of claim 7, wherein the non-USB device is a bluetooth device.

* * * * *